(12) United States Patent
Kasai et al.

(10) Patent No.: US 9,909,578 B2
(45) Date of Patent: Mar. 6, 2018

(54) INTEGRATED ELECTRIC COMPRESSOR

(75) Inventors: Shigeo Kasai, Aichi-ken (JP); Koji Nakano, Aichi-ken (JP); Koji Toyama, Aichi-ken (JP); Makoto Hattori, Aichi-ken (JP); Kazuki Niwa, Aichi-ken (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1233 days.

(21) Appl. No.: 12/439,593

(22) PCT Filed: Sep. 28, 2007

(86) PCT No.: PCT/JP2007/069098
§ 371 (c)(1),
(2), (4) Date: Jul. 2, 2009

(87) PCT Pub. No.: WO2008/108022
PCT Pub. Date: Sep. 12, 2008

(65) Prior Publication Data
US 2009/0291002 A1    Nov. 26, 2009

(30) Foreign Application Priority Data
Mar. 1, 2007 (JP) ................................. 2007-051665

(51) Int. Cl.
*F04B 35/04* (2006.01)
*H02K 11/05* (2016.01)
(Continued)

(52) U.S. Cl.
CPC ............ *F04B 35/04* (2013.01); *F04B 39/121* (2013.01); *H02K 11/05* (2016.01); *H02K 11/33* (2016.01);
(Continued)

(58) Field of Classification Search
USPC ............ 417/410.1; 318/254, 609, 610, 400.3
See application file for complete search history.

(56) References Cited

U.S. PATENT DOCUMENTS 4,358,730 A * 11/1982 Beifus ........................... 323/322
4,371,824 A *  2/1983 Gritter ........................... 318/722
(Continued)

FOREIGN PATENT DOCUMENTS

| EP | 1 271 067 A1 | 1/2003 |
| JP | 5-110215 A | 4/1993 |

(Continued)

OTHER PUBLICATIONS

Machine Translation of JP2002291260(A), Published Oct. 4, 2002.*
(Continued)

*Primary Examiner* — Charles Freay
(74) *Attorney, Agent, or Firm* — Westerman, Hattori, Daniels & Adrian, LLP (57) ABSTRACT

There is provided an integrated electric compressor that can be made small in size while reducing radio noise effectively. In an inverter of the electric compressor, a snubber circuit 21 comprising a resistor R and a capacitor C is provided between input/output terminals 20 of a power source and a switching element 18. The snubber circuit 21 is formed by surface mounting a resistive element constituting the resistor R and a capacitor element constituting the capacitor C on a power board 16. A leakage current from a motor 19 is thus restrained and radio noise is reduced. The resistive element and the capacitor element constituting the snubber circuit 21 are preferably surface mounted on the power board 16 on the side opposite to the side on which a control circuit board is arranged.

4 Claims, 7 Drawing Sheets

(51) Int. Cl.
- *F04B 39/12* (2006.01)
- *H02P 27/06* (2006.01)
- *H02K 11/33* (2016.01)
- *H02K 11/02* (2016.01)
- *H02M 7/00* (2006.01)

(52) U.S. Cl.
CPC ...... *H02P 27/06* (2013.01); *F04B 2203/0204* (2013.01); *H02K 11/024* (2013.01); *H02M 7/003* (2013.01)

(56) References Cited

U.S. PATENT DOCUMENTS

| | | | | |
|---|---|---|---|---|
| 4,575,668 | A * | 3/1986 | Baker | 318/811 |
| 4,990,057 | A * | 2/1991 | Rollins | 417/12 |
| 5,013,990 | A * | 5/1991 | Weber | 318/814 |
| 7,038,415 | B2 | 5/2006 | Nakamura et al. | 318/471 |
| 7,429,842 | B2 * | 9/2008 | Schulman et al. | 318/482 |
| 8,308,442 | B2 * | 11/2012 | Tsutsui et al. | 417/44.1 |
| 2001/0012212 | A1 | 8/2001 | Ikeda | |
| 2002/0118496 | A1 * | 8/2002 | Petruska | 361/23 |
| 2004/0197213 | A1 * | 10/2004 | Takemoto | 417/410.1 |
| 2005/0162140 | A1 * | 7/2005 | Hirst | 323/273 |

FOREIGN PATENT DOCUMENTS

| | | |
|---|---|---|
| JP | 2001-359280 A | 12/2001 |
| JP | 2002-081712 A | 3/2002 |
| JP | 2002-291260 A | 10/2002 |
| JP | 2003-319665 A | 11/2003 |
| JP | 2004-135440 A | 4/2004 |
| JP | 2004-308445 A | 11/2004 |
| JP | 2006-027315 A | 2/2006 |

OTHER PUBLICATIONS

International Search Report of PCT/JP2007/069098; dated Dec. 25, 2007.

Japanese Notice of Allowance dated Apr. 11, 2012, issued in corresponding Japanese Patent Application No. 2007-051665, (6 pages). W/ English Translation.

Extended (Supplementary) European Search Report dated Nov. 17, 2016, issued in counterpart European atent Application No. 07828839.6. 9. (10 pages).

* cited by examiner

INTEGRATED ELECTRIC COMPRESSOR

TECHNICAL FIELD

The present invention relates to an integrated electric compressor constituting an on-vehicle air conditioner.

BACKGROUND ART

For an on-vehicle air conditioner, space saving is required to accommodate pieces of equipment in a vehicular engine room. To meet this requirement, in recent years, there has been provided an integrated electric compressor in which a compressor constituting the on-vehicle air conditioner, a motor for driving the compressor, and a driving board for driving the motor are integrally accommodated in a housing.

Figure 6:
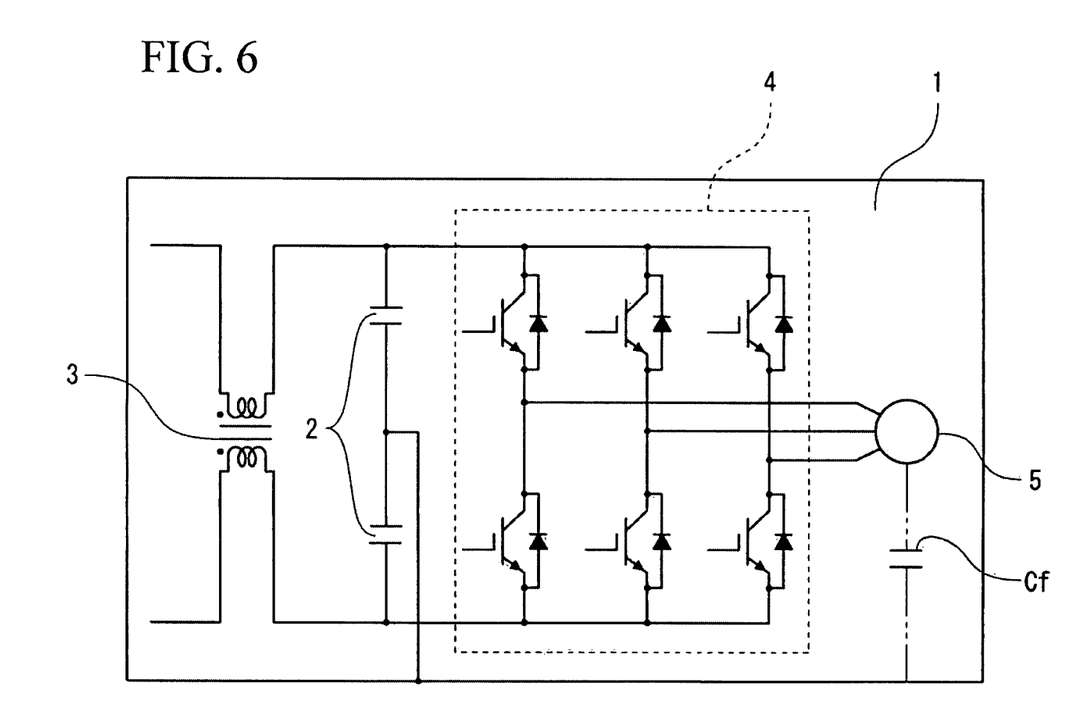
FIG. 6 is a diagram showing a circuit configuration of a conventional motor driving circuit.

In such an integrated electric compressor, since a floating capacity Cf is present between a motor 5 and a housing as shown in FIG. 6, if a power supply voltage supplied to the motor 5 is caused to fluctuate by the switching action of a switching element 4 of a driving board 1, a leakage current flowing from the motor 5 to the housing is generated. Since this leakage current produces radio noise, a proposal has been made that by providing common mode capacitors 2 and a common mode coil 3 on the driving board 1, a loop formed by the leakage current is made small in the case where the voltage supplied to the motor 5 is caused to fluctuate by the switching action of the switching element 4, by which an influence of radio noise is reduced.

Patent Document 1: Japanese Patent Laid-Open No. 2006-27315

DISCLOSURE OF THE INVENTION

Problems to be Solved by the Invention

However, the common mode capacitors 2 and the common mode coil 3 each have a large part size. Since on-vehicle equipment including the electric compressor is always required to be downsized, further improvement is desired from this point of view. Also, the large part size restricts the arrangement of these parts in the housing, which also hinders the downsizing.

Figure 7:
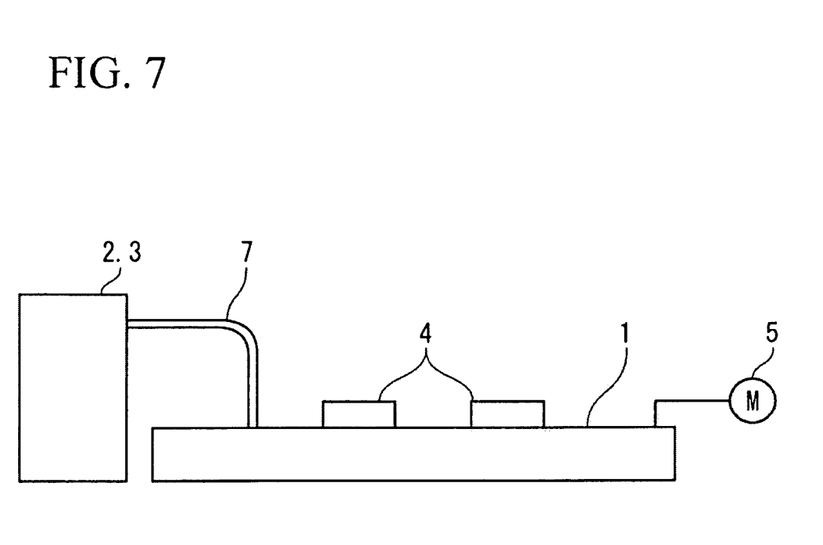
FIG. 7 is a view showing an example of an arrangement in a case where a common mode capacitor and a common mode coil are used.

Also, from the viewpoint of radio noise reduction as well, further improvement is required. As shown in FIG. 7, in the case where the common mode capacitors 2 and the common mode coil 3 are used, a lead wire (electric wire) 7 is used for wiring between driving board 1 and these parts. As the length of the lead wire 7 increases, the fluctuations in power supply voltage caused by the switching action of the driving board 1 increase, and an influence on radio noise increases. Also, the leakage current flowing from the motor 5 to the housing generates a high-frequency component due to surge caused especially when the current is turned off, so that the improvement in radio noise at this time is especially desired.

The present invention has been made to solve the above technical problems, and accordingly an object thereof is to provide an integrated electric compressor that can be made small in size while reducing radio noise effectively.

Means for Solving the Problems

An integrated electric compressor of the present invention made to achieve the above object comprises a compressor constituting an air conditioner; a motor driving the compressor; a control board controlling the operation of the motor; and a housing accommodating the compressor, the motor, and the control board. The control board is characterized by comprising a switching element controlling the application of a voltage to the motor from a power source to rotationally drive the motor; a control circuit controlling the operation of the switching element; and a snubber circuit which is provided between the power source and the switching element to reduce radio noise and comprises a resistor and a capacitor.

The resistor and the capacitor constituting the snubber circuit are preferably surface mounted on a first board.

Also, it is preferable that the control circuit be mounted on a second board arranged so as to face to the first board with a space being provided therebetween, and the snubber circuit be mounted on the first board on the surface opposite to the side facing the second board.

Further, power wiring for applying a voltage from the power source to the first board is preferably formed by a bus bar.

In the case where the air conditioner is mounted on a vehicle, the present invention can be applied especially effectively.

Advantages of the Invention

According to the present invention, since the snubber circuit is provided in the circuit for driving the motor of the integrated electric compressor, radio noise can be reduced. Since the snubber circuit can be made a surface mounting part, the leakage current is reduced, and the size of a closed loop formed by the leakage current is decreased, which is especially effective in reducing radio noise. Also, by making the snubber circuit a surface mounting part, the size of the integrated electric compressor can be decreased.

DESCRIPTION OF SYMBOLS

10 . . . electric compressor (integrated electric compressor), 11 . . . housing, 12 . . . inverter board (control board), 13 . . . capacitor, 14 . . . inductor, 15 . . . control circuit board (control circuit, second board), 16 . . . power board (first board), 18 . . . switching element, 19 . . . motor, 20 . . . input/output terminal, 21 . . . snubber circuit, 21*c* . . . capacitor element, 21*r* . . . resistive element, 23, 24 . . . bus bar

BEST MODE FOR CARRYING OUT THE INVENTION

The present invention will now be described in detail based on an embodiment shown in the accompanying drawings.

Figure 1:
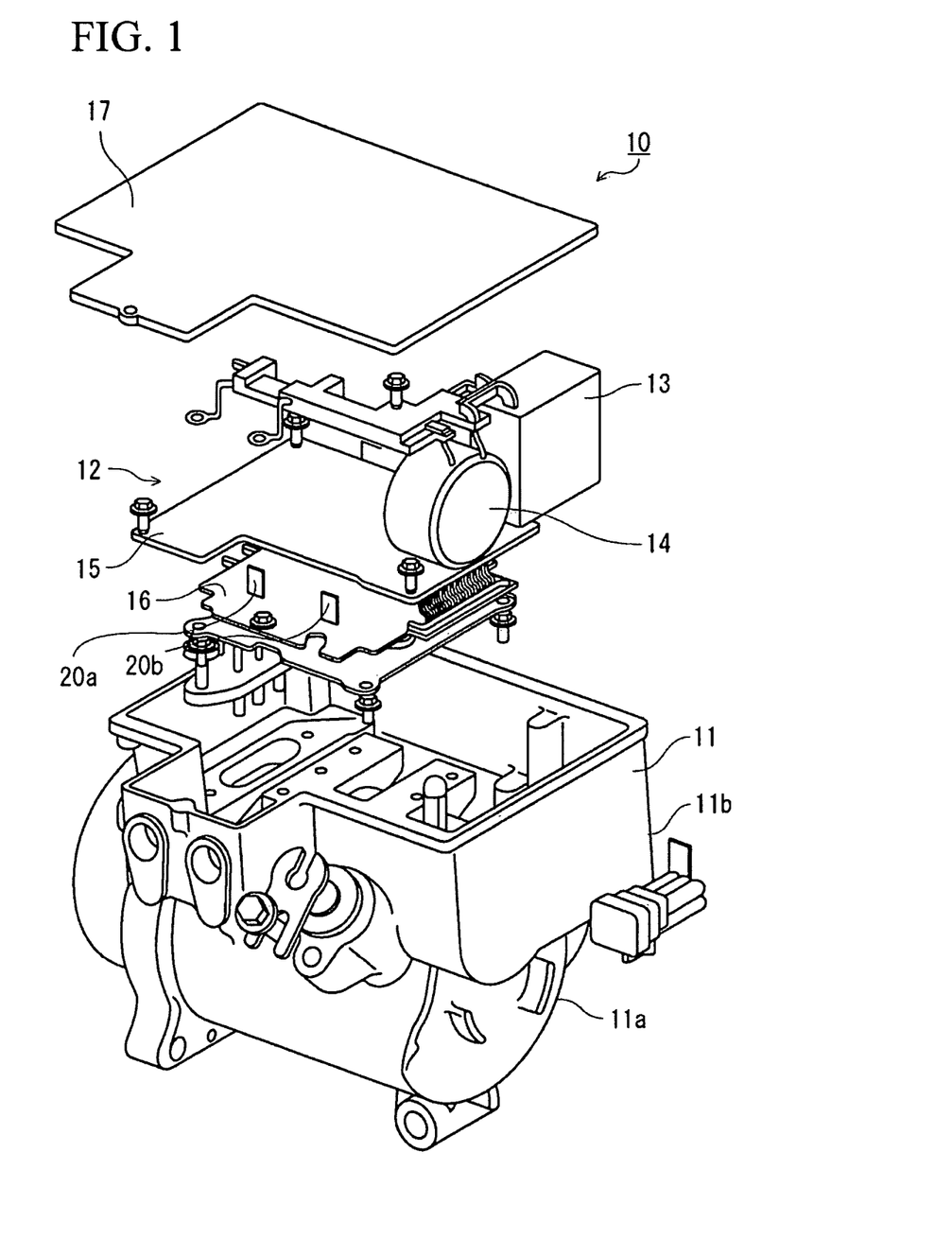
FIG. 1 is a view showing a general configuration of an electric compressor in accordance with an embodiment.

FIG. 1 is a view showing a configuration of an electric compressor (integrated electric compressor) 10 of this embodiment.

As shown in FIG. 1, for an electric compressor 10, a motor (not shown) and a scroll compressor (not shown) are accommodated in a lower accommodation chamber 11a of a housing 11, and an inverter board (control board) 12 is accommodated in an upper accommodation chamber 11b, which is open upward, of the housing 11. The upward opening of the upper accommodation chamber 11b is covered with a cover 17.

The inverter board 12 comprises a capacitor 13 and an inductor 14, which are used for smoothing a dc voltage supplied to the inverter board 12, a control circuit board (control circuit, second board) 15 for controlling the application of a high-voltage alternating current to the motor, and a power board (first board) 16 for converting a direct current supplied from a high-voltage power source into an alternating current and applying the alternating current to the motor to rotationally drive the motor.

Figure 2:
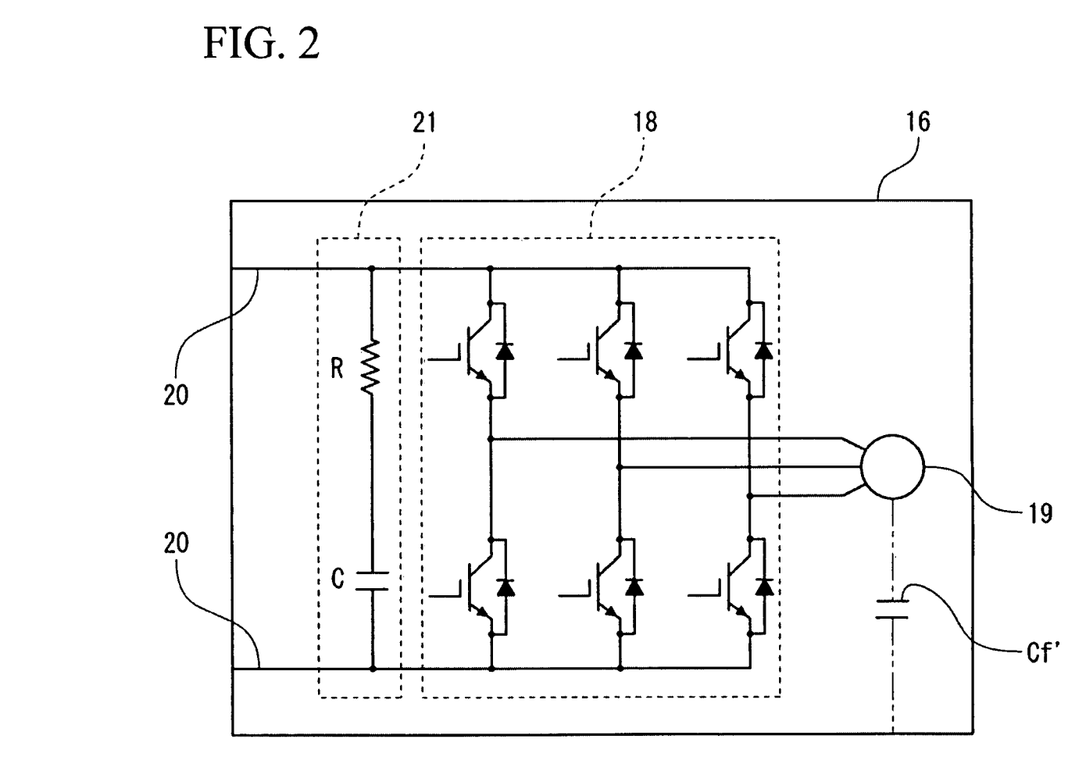
FIG. 2 is a diagram showing a circuit configuration of a power board.

FIG. 2 is a diagram showing a circuit configuration of the power board 16. As shown in FIG. 2, to the power board 16, a high voltage, for example, as high as 300 V is supplied from an external high-voltage power source (not shown). On the power board 16, a switching element 18 formed by a plurality of IGBTs is mounted. On the control circuit board 15, a microcomputer for controlling the operation of the switching element 18 and a gate circuit (both of the two not shown) are provided. The gate circuit is driven by the control of the microcomputer, and the drive signal thereof is transmitted from the control circuit board 15 to the power board 16 and is input to the switching element 18, by which the switching element 18 is operated. Thereby, the high voltage supplied from the high-voltage power source is applied to a motor 19 of the electric compressor 10 as a three-phase alternating current, by which the motor 19 is rotationally driven.

In the circuit of the power board 16 described above, a snubber circuit 21 consists of a resistor R and a capacitor C is provided between input/output terminals 20 of the power source and the switching element 18.

The snubber circuit 21 is originally used for protecting the switching element 18 from overvoltage, and when the power source is off, the snubber circuit 21 consumes a surge occurring as the frequency of a drive signal sent from the control circuit board 15 to the switching element 18 increases.

By consuming the surge current in the snubber circuit 21 in this manner, a high-frequency component can be made such as not to be included in the drive signal sent from the control circuit board 15 to the switching element 18. As a result, a leakage current produced between the motor 19 and the housing 11 can be restrained, and radio noise can be reduced.

Figure 3:
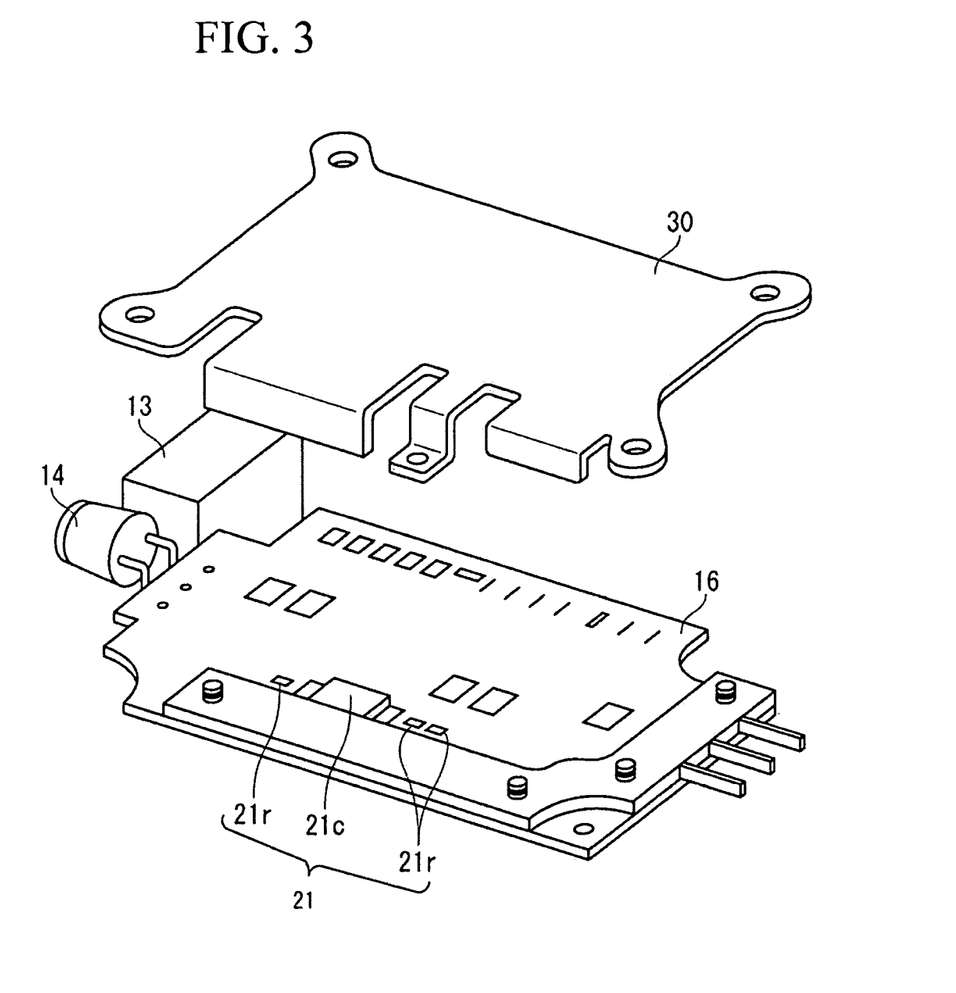
FIG. 3 is a view showing a state in which a resistive element and a capacitor element constituting a snubber circuit are surface mounted on a power board.

As shown in FIG. 3, the snubber circuit 21 is configured by surface mounting resistive elements 21r constituting the resistor R and a capacitor element 21c constituting the capacitor C on the power board 16. In the snubber circuit 21, since the capacitor capacity of the capacitor element 21c can be decreased, the surface mounting type snubber circuit 21 is realistic.

Since the resistive elements 21r and the capacitor element 21c are surface mounted on the power board 16, a space for providing a common mode capacitor and a common mode coil is substantially unnecessary as compared with the case where the conventional common mode capacitor and common mode coil are used, so that the size of the electric compressor 10 can be decreased.

Also, in the case where the conventional common mode capacitor and common mode coil are used, since the common mode capacitor and the common mode coil are inevitably arranged on the outside of the board because of their large sizes, the connection to the common mode capacitor and the common mode coil has conventionally been made by using a lead wire. In contrast, if the resistive elements 21r and the capacitor element 21c constituting the snubber circuit 21 are surface mounted on the power board 16, the resistive elements 21r and the capacitor element 21c naturally do not require a lead wire, so that the floating inductance can be reduced. Thereby, the radio noise reducing effect is further increased.

Also, if the resistive elements 21r and the capacitor element 21c constituting the snubber circuit 21 are surface mounted on the power board 16, a closed loop of current formed by a leakage current produced by a floating capacity Cf between the motor 19 and the housing 11 flows in the resistive elements 21r and the capacitor element 21c on the power board 16. That is to say, the closed loop formed by the leakage current does not extend to the outside from the power board 16, and is completed by between the power board 16 and the housing 11. The fact that the closed loop itself formed by the leakage current can be decreased contributes greatly to the reduction in radio noise.

Since the snubber circuit 21 having a leakage current restraining effect is provided, the leakage current is restrained, and radio noise is reduced. Further, since the snubber circuit 21 is surface mounted on the power board 16, the radio noise reducing effect is further remarkable.

As shown in FIG. 1, the control circuit board 15 and the power board 16 are provided so as to face to each other with a space being provided therebetween. Also, as shown in FIG. 3, the power board 16 is provided with a heat radiating plate 30 for radiating heat of the switching element 18.

Figure 4:
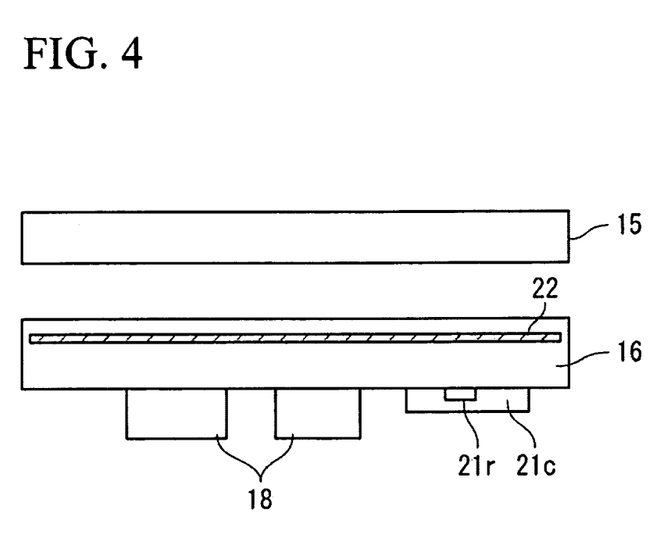
FIG. 4 is a view showing an arrangement of a snubber circuit with respect to a control circuit board.

As shown in FIG. 4, the resistive elements 21r and the capacitor element 21c constituting the snubber circuit 21 and the switching element 18 are preferably surface mounted on the power board 16 on the side opposite to the side on which the control circuit board 15 is arranged.

By doing this, by a surface (layer) 22 having low impedance, which is formed of a conductive material, such as a power frame, a GND frame, or a GND layer, provided in the power board 16, an effect of shielding noise generated by the switching element 18 and the like is achieved, and an influence on the control circuit board 15 is restrained. Since the control circuit board 15 is provided with a digital circuit such as a microcomputer driven by a low voltage, by restraining noise from the switching element 18, malfunction of the microcomputer and the like can be prevented.

Figure 5:
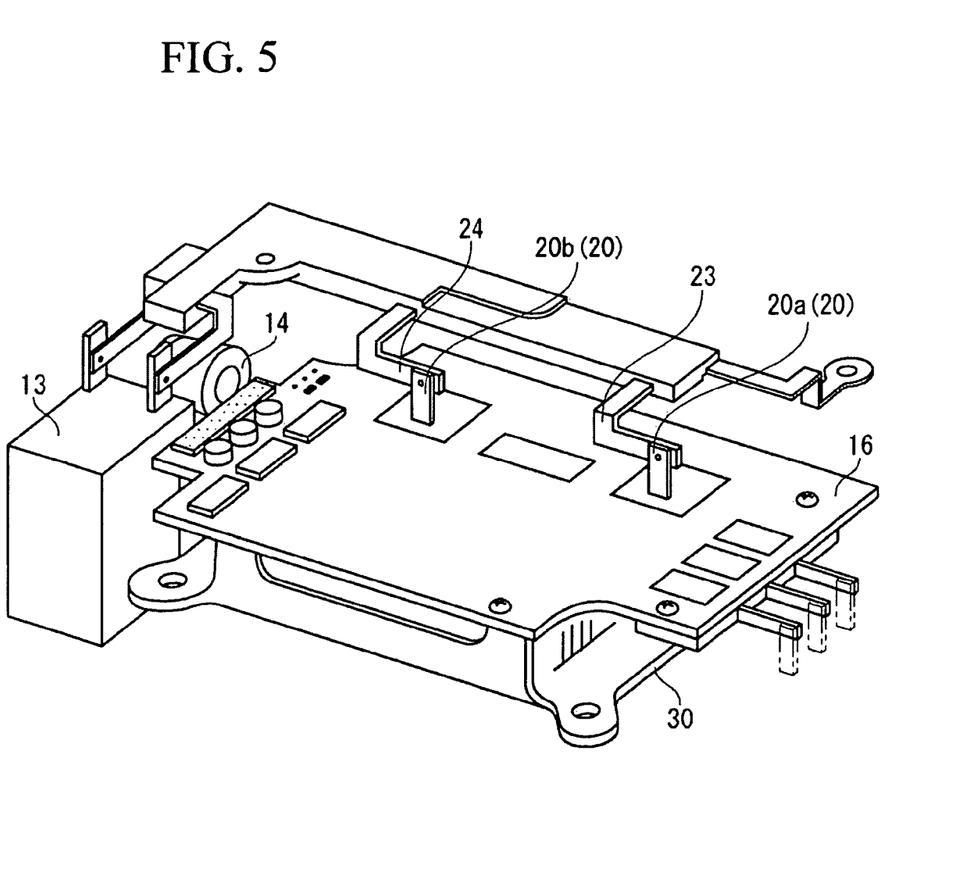
FIG. 5 is a view showing a configuration for supplying electric power from a power source to a power board by using a bus bar.

Also, power is supplied from the high-voltage power source to the power board 16 via the input/output terminals 20. As shown in FIG. 5, the input/output terminals 20 comprises pin-shaped PN terminals 20a and 20b mounted on the power board 16. The electrical continuity to the PN terminals 20a and 20b is made by the connection of bus bars 23 and 24 from the high-voltage power source side.

Thus, since connection using the bus bars 23 and 24 is used for power wiring for applying a power supply voltage to the power board 16, the impedance of the power wiring can be reduced significantly as compared with the case where a lead wire is used. As a result, the fluctuations in the power supply voltage can be restrained, which contributes to the reduction in radio noise. In particular, in the case where the conventional common mode capacitor and common mode coil are used, as the length of lead wire increases, the impedance of the power wiring increases. Therefore, in the conventional construction, since the sizes of the common mode capacitor and common mode coil are large, the arrangement thereof is restricted, and the length of lead wire for power wiring increases resultantly. An advantage of the construction using the bus bars 23 and 24 of this embodiment is enormous as compared with such the conventional case.

As described above, according to the present invention, the leakage current from the motor 19 is restrained and radio noise is reduced, and further the size of the electric compressor 10 can be made small.

In the above-described embodiment, the shapes and constructions of parts of the electric compressor 10, the configuration of the inverter board 12, and the like have been explained. However, it is not intended that the present invention be limited to the above-described configurations for other matters than the spirit of the present invention.

The configurations described in the above embodiment can be selected or can be changed appropriately without departing from the spirit and scope of the present invention.

The invention claimed is:

1. An integrated electric compressor comprising:
   a compressor constituting an air conditioner;
   a motor driving the compressor;
   a control board controlling the operation of the motor; and
   a housing accommodating the compressor, the motor, and the control board, wherein
   the control board comprises:
   a switching element controlling the application of a voltage to the motor from a power source to rotationally drive the motor;
   a control circuit controlling the operation of the switching element; and
   a snubber circuit which is provided between the power source and the switching element to reduce radio noise and consists of a resistor and a capacitor, wherein
   the resistor and the capacitor constituting the snubber circuit are surface mounted on a first board, and
   the snubber circuit is connected to input/output terminals of the power source.

2. The integrated electric compressor according to claim 1, wherein the control circuit is mounted on a second board arranged so as to face to the first board with a space being provided therebetween, and
   the snubber circuit is mounted on the first board on the surface opposite to the side facing the second board.

3. The integrated electric compressor according to claim 1, wherein power wiring for applying a voltage from the power source to the first board is formed by a bus bar.

4. The integrated electric compressor according to claim 1, wherein the integrated electric compressor is mounted on a vehicle.

* * * * *